April 7, 1925.                                                                1,532,350
W. A. SHATTO
METHOD OF MAKING HELICAL EXPANSIBLE REAMERS
Filed Dec. 29, 1923
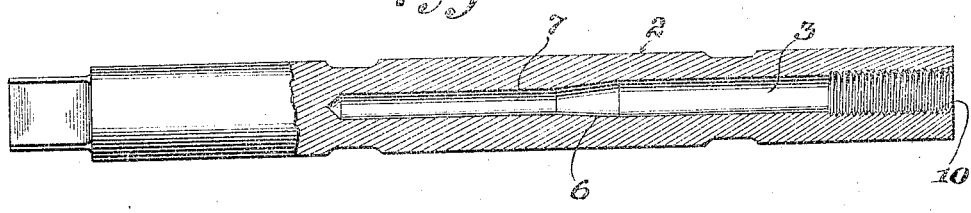
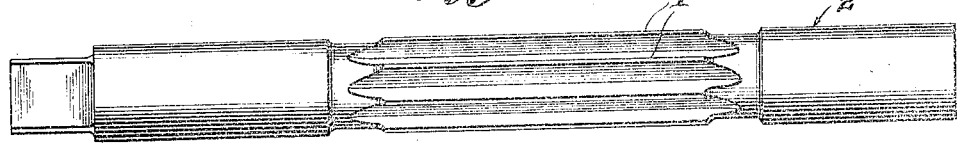
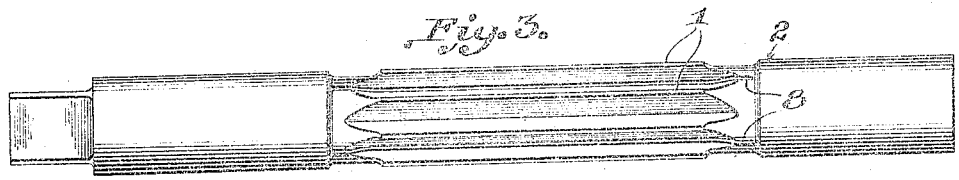
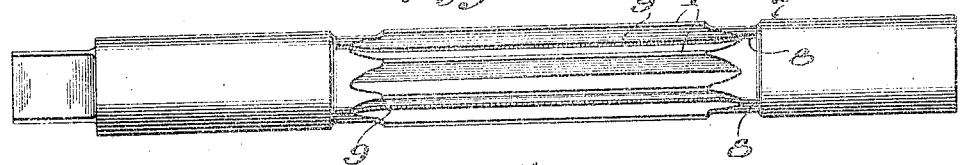
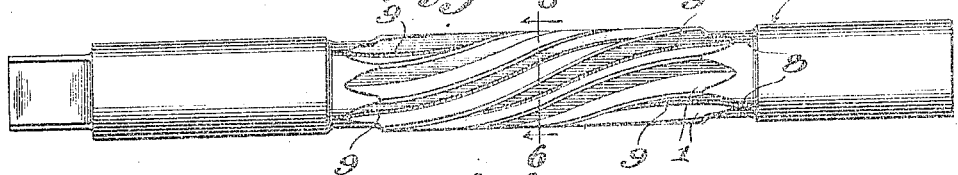
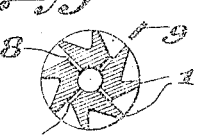
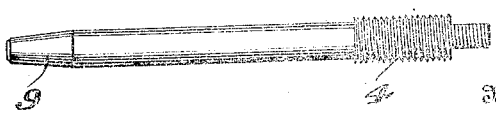
Inventor
W. A. Shatto
By Moser Fenwick Lawrence
Attorneys Patented Apr. 7, 1925.

1,532,350

UNITED STATES PATENT OFFICE.

WALTER A. SHATTO, OF MILLERSBURG, PENNSYLVANIA.

METHOD OF MAKING HELICAL EXPANSIBLE REAMERS.

Application filed December 29, 1923. Serial No. 683,524.

*To all whom it may concern:*

Be it known that I, WALTER A. SHATTO, a citizen of the United States, residing at Millersburg, in the county of Dauphin and State of Pennsylvania, have invented certain new and useful Improvements in Methods of Making Helical Expansible Reamers; and I do hereby declare the following to be a full, clear, and exact description of the invention, such as will enable others, skilled in the art to which it appertains to make and use the same.

This invention relates to a method of making a helical expansible reamer from solid stock, the object being to obtain or provide an expansible reamer having as great or greater helical angle of its flutes as is obtainable in non-expansible reamers.

It is well known in the art that reamers having helical flutes function much more efficiently than reamers with straight flutes, but prior to my invention it has not been possible to make an expansible reamer having flutes of as great helical angle as can be provided in solid or non-expansible reamers.

One of the reasons, if not the main reason, which has made it impossible to make an expansible reamer of as great helical angle of its flutes as in solid reamers is that it has not been possible to cut slots between the flutes of as great helical angle as the flutes. The slots are cut by a saw, and due to the fact that the diameter of the saw must be such that it can be suitably held on its arbor and also of such diameter as to enable the proper depth of slot to be cut, the saw becomes of such diameter as to prevent cutting of a helical slot of any great angle. If too great a helical slot is attempted to be cut, the saw will bind in the slot and buckle up and break.

Referring to the accompanying drawings, Fig. 1 is a sectional view showing the stock from which the reamer is to be made, the stock having been bored with bores of two different diameters and threaded at one end.

Fig. 2 is a plan view of the partially completed reamer, the same having been fluted.

Fig. 3 is a view similar to Fig. 2 showing the slots between certain of the flutes of the reamer.

Fig. 4 is a view similar to Fig. 3 showing the filling strips as having been inserted in the slots.

Fig. 5 shows the reamer as having been twisted, the filling strips remaining in place.

Fig. 6 is a cross-sectional view on line 6—6 of Fig. 5, the filling strips having been removed from the slots; and Fig. 7 is a view of the expander element.

The helical expansible reamer made in accordance with my invention is of the type having flutes 1 intermediate the ends of the reamer body 2, that is to say, the flutes terminate short of the ends of the reamer. The reamer has a central bore 3 extending from one end thereof to a point adjacent the far end of the flutes. The open end of the bore is threaded to receive a screw 4 which has a pointed end 5 adapted to engage a conical seat 6 within the bore intermediate the ends of the flutes to expand the latter as may be required. The conical seat is formed by enlarging the bore from its open end to said seat. This manner of obtaining expansion of the reamer is well known in the art and is no part of the present invention.

According to the preferred method of my invention, I first provide the reamer body with a central bore 7 of uniform diameter, the bore extending from one end of the reamer to a point somewhat in advance of the point where the flutes 1 will be. The flutes are milled in the usual manner and are preferably milled straight. At this point, it may be stated that it is optional whether or not the flutes are first provided or whether the bore is first provided. After the flutes have been provided, a plurality of slots 8 are cut by means of a saw between the flutes, the slots extending parallel with the flutes and through the shell formed by the central bore. As already stated, the flutes are preferably milled straight, and consequently the slots are also milled on a straight line parallel with the axis of the reamer. At least three slots should be provided to effect a uniform expansion of the reamer, but more than three slots may be provided if desirable. It will be understood that the number of flutes may be in excess of the number of slots, and consequently two or more flutes may be included on the segment between said slots. The number of flutes provided will depend on the diameter of the reamer and will conform to approved reamer design.

I have stated that the flutes and slots should be milled straight. This is primarily for the reason that a straight flute reamer is more cheaply made than a reamer having helical flutes; and furthermore, no trouble will then be experienced in cutting the slots.

In order to obtain the desired twist or helical angle of the flutes, I place filler strips 9 in the slots and heat the reamer sufficiently to enable the same to be twisted in the fluted and slotted part, which, as already stated, is intermediate the ends of the reamer. Twisting of the reamer is preferably accomplished by placing the same between two members adapted to grip the terminal ends thereof and then turning one of said gripping members sufficiently to impart the desired degree of twist or helical angle to the flute. The filling strips in the slots are then removed and the reamer further bored to provide the large bore 3 and the internal threads 10 at one end of the reamer and then treated and finished in the usual manner; that is to say, by tempering and grinding. It is found necessary to provide filling strips in the slots to prevent the latter from closing up when the reamer is twisted.

While I prefer to make the reamer according to the method just described, the reamer can be made by a slight variation of my preferred method, namely, by postponing the making of the bore until after the reamer has been twisted. According to this modified form of the invention the reamer will be fluted and slotted in the manner already described, but inasmuch as the reamer body has not been provided with a central bore, the reamer segments between the slots will be connected to a central core, it being understood that the depth of the slot is not sufficient to reach to the center of the reamer. After the reamer has been fluted and slotted, the same is heated and twisted in the manner described above. Thereafter, the reamer is bored to remove the core, the bore being of such diameter that the segments of the reamer between the slots will be free from one another. The reamer is then finished in the manner already described in connection with the preferred method. It may be stated at this point that filling strips need not be inserted in the slots when the core is left in the reamer during the twisting operation. The interconnection between the reamer segments by the core is such that the slots will not close up during the twisting operation.

It will now be seen that I have provided a simple and practical method for obtaining helical expansible reamers. As heretofore stated, it has not been possible prior to my invention to provide a reamer having helical flutes of great angle, the reamer having a bore providing for the insertion of an expanding element. Reamers made according to the present invention meet a long-felt want in the art and have met with great commercial success. The scope of the invention is defined by the appended claims.

What I claim is—

1. The steps in the method of making an helical expansible reamer which consists in providing flutes and radial slots between and parallel with the flutes, and heating the reamer and twisting the same to obtain the desired helical angle of the flutes.

2. The method of making a reamer which consists in providing a central bore of uniform diameter in the reamer body, providing flutes and radial slots between and parallel with the flutes, placing filler strips in the slots, heating the reamer, and twisting the same to obtain the desired helical angle of the flutes.

3. The method of making an expansible reamer from solid stock which consists in providing a central bore of uniform diameter in the reamer body, providing flutes and radial slots between and parallel with the slots, the slots extending through the shell formed by said bore, placing filler strips in the slots, heating the reamer, and twisting the same to obtain the desired helical angle of the flutes.

4. The method of making an expansible reamer from solid stock which consists in providing a central bore of uniform diameter in the reamer body, providing flutes and radial slots between and parallel with the slots, intermediate the ends of the said body, the slots extending through the shell formed by said bore, placing filler strips in the slots, heating the reamer, and twisting the same to obtain the desired helical angle of the flutes.

5. The method of making a reamer which consists in providing flutes and radial slots between and parallel with the flutes, heating the reamer and twisting the same to obtain the desired helical angle of the flutes, and thereafter boring the reamer to free the segments between the slots.

6. The method of making a reamer which consists in providing flutes and radial slots between and parallel with the flutes, intermediate the ends of the said body, heating the reamer and twisting the same to obtain the desired helical angle of the flutes, and thereafter boring the reamer to free the segments between the slots.

In testimony whereof I affix my signature.

WALTER A. SHATTO.